United States Patent [19]
Hillestad

[11] Patent Number: 5,582,538
[45] Date of Patent: *Dec. 10, 1996

[54] BOILER TUBE CUTTING APPARATUS

[76] Inventor: Tollief O. Hillestad, 108 9th Ave., W. Summerland Key, Fla. 33042

[*] Notice: The term of this patent shall not extend beyond the expiration date of Pat. No. 5,199,221.

[21] Appl. No.: 222,110

[22] Filed: Apr. 4, 1994

[51] Int. Cl.⁶ ........................................................ B26D 1/18
[52] U.S. Cl. .............................. 451/154; 83/487; 83/629
[58] Field of Search ......................... 83/54, 486.1, 487, 83/629, 745, 744, 743; 451/154; 29/726, 727, 890.031, 890.051

[56] References Cited

U.S. PATENT DOCUMENTS

| | | | |
|---|---|---|---|
| 2,378,554 | 6/1945 | Irwin, Jr. | 83/743 |
| 2,573,991 | 11/1951 | Schildknecht | 83/743 |
| 2,608,220 | 8/1952 | Cauthen | 83/745 |
| 3,073,073 | 1/1963 | Van Pelt | 83/745 X |
| 3,293,963 | 12/1966 | Carroll et al. | 83/54 X |
| 3,323,507 | 6/1967 | Schuman | 125/14 |
| 3,667,855 | 6/1972 | Douglass et al. | 408/114 |
| 3,722,497 | 3/1973 | Hiestand et al. | 125/14 |
| 3,763,845 | 10/1973 | Hiestand et al. | 125/14 |
| 4,633,555 | 1/1987 | Legge | 83/54 X |
| 4,718,201 | 1/1988 | Legge | 83/54 X |
| 4,739,688 | 4/1988 | Brennan et al. | 83/745 |
| 4,830,551 | 5/1989 | Brennan et al. | 83/745 X |
| 4,872,249 | 10/1989 | VanderPol et al. | 83/485 |
| 4,979,294 | 12/1990 | Bowman et al. | 29/890.031 |
| 5,033,347 | 7/1991 | Hillestad et al. | 83/745 X |
| 5,044,075 | 9/1991 | Brennan et al. | 83/745 |
| 5,081,768 | 1/1992 | Brennan et al. | 30/101 |
| 5,107,594 | 4/1992 | Ferreras | 83/745 X |
| 5,199,221 | 4/1993 | Hillestad | 83/487 |

FOREIGN PATENT DOCUMENTS

| | | |
|---|---|---|
| 2054441 | 2/1981 | United Kingdom. |
| PCT/US95/ 04167 | 4/1995 | WIPO. |

Primary Examiner—Rinaldi I. Rada
Assistant Examiner—Elizabeth Stanley
Attorney, Agent, or Firm—Hudak & Shunk Co. L.P.A.

[57] ABSTRACT

A portable tube cutting apparatus which facilitates smooth, even cuts through a boiler tube-wall includes a frame supporting a movable carriage, a motor driven cutting tool secured to the carriage, and an articulated support means which allows for rotation of the cutting apparatus about a fixed point of securement to the boiler tube-wall and thereby permits lateral repositioning of the cutting apparatus relative to the point of securement to the boiler tube-wall. The apparatus has the advantage of permitting relatively long cuts such as up to about 3 feet to be made in a tube-wall While reducing the amount of time and effort needed to install and set up such apparatus relative to conventional track mounted apparatuses.

13 Claims, 3 Drawing Sheets

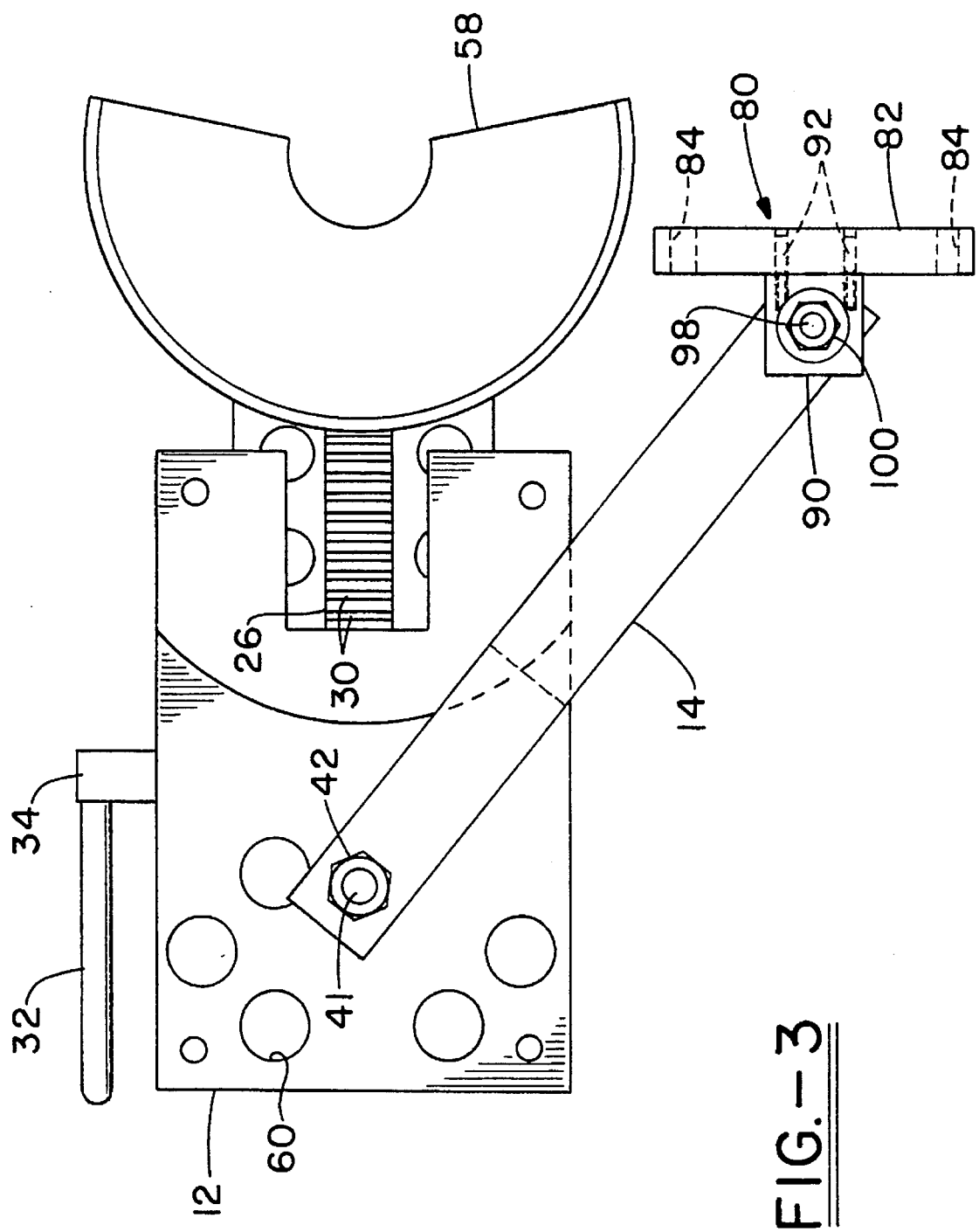

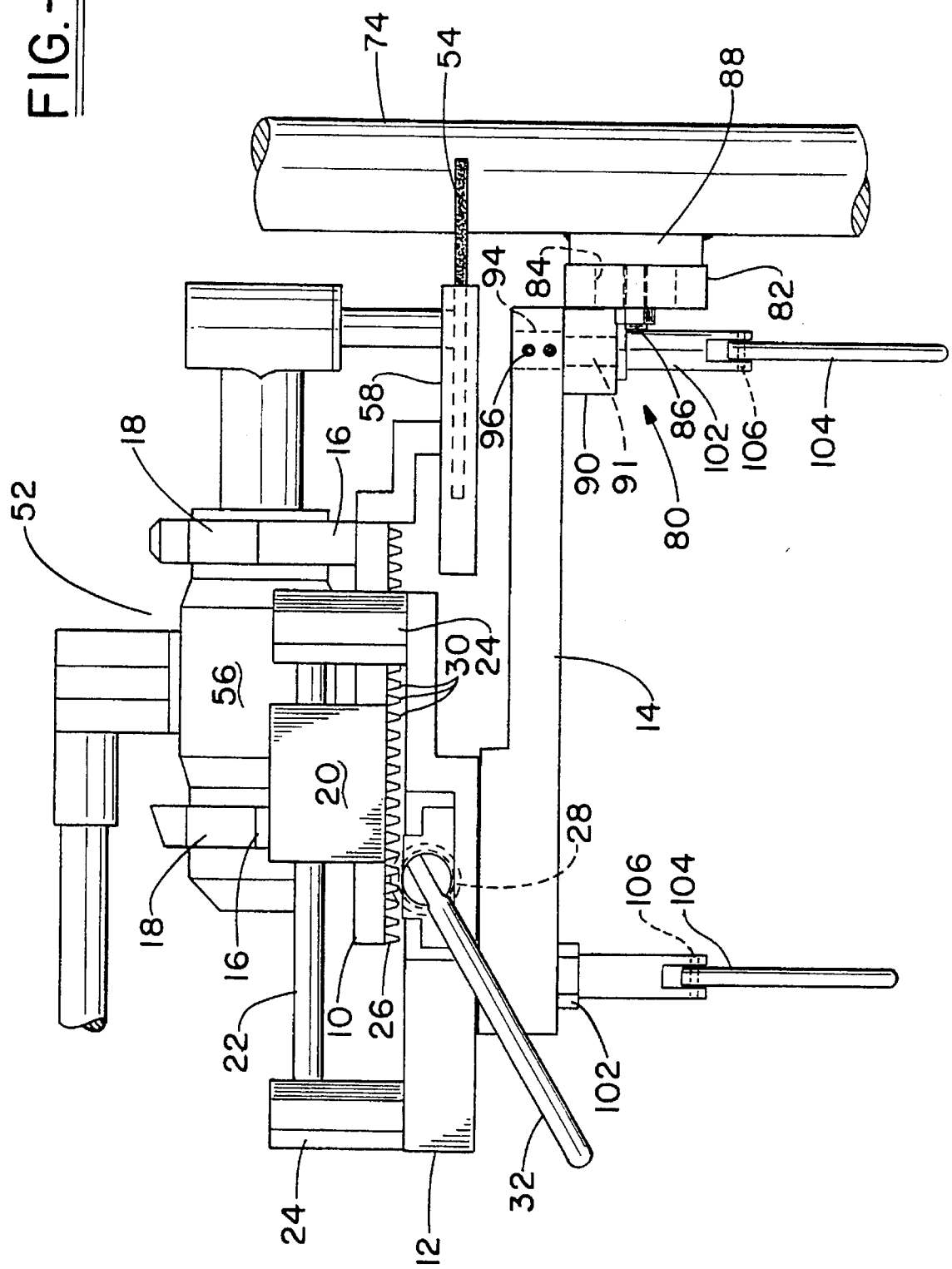

BOILER TUBE CUTTING APPARATUS

FIELD OF THE INVENTION

This invention relates to an apparatus for cutting boiler tube-walls such as are common at power generating stations. More specifically, the present invention relates to a compact, light weight apparatus for supporting cutting means for liner motion along a fixed plane relative to the axial direction of the tubes of a tube-wall.

BACKGROUND OF THE INVENTION

In certain industrial process plants, as for example, in steam generating plants, it often becomes necessary to cut out and replace sections or panels of a boiler tube-wall which have rusted or otherwise become damaged or deteriorated. Tube-wall sections are generally removed by using either hand held tools such as motor driven saws or cutting torches, or more desirably by using any of various track mounted cutting apparatuses. Hand held tools are generally undesirable, especially for removing more than a single tube from a tube-wall, because they tend to produce uneven cuts which make it difficult to weld a replacement tube-wall section onto the existing tube-wall. Track mounted cutting apparatuses such as those disclosed in U.S. Pat. No. 5,033,347 are preferred when relatively large sections of tube-wall, such as sections more than 3 feet in length, are to be removed. Conventional track mounted boiler cutting apparatus are however, relatively heavy, bulky and awkward, and require a relatively substantial amount of time and labor for installation and set-up. Accordingly, such track mounted apparatuses are not ideally suited for removing relatively short sections of boiler tube-wall.

A portable tube cutting apparatus having a vice-like fastener for supporting the apparatus from a stationary object, such as the tube which is to be cut, is disclosed in U.S. Pat. No. 5,199,221. The disclosed apparatus can be used to cut the tube which supports the apparatus as well as other adjacent tubes in close proximity. The device however is not generally suitable for cutting along a section of tube-wall wherein the individual tubes are continuously connected to an adjacent tube by a membrane, and wherein the tubes are generally too closely spaced to one another to permit use of the vice-like fastener for supporting the cutting apparatus on one of the tubes.

Accordingly, it would be highly desirable to provide a tube cutting apparatus which is lighter, more portable, and easier to install and set up than conventional track mounted cutting apparatuses, and which can be quickly and stably fastened to a tube-wall to allow a smooth even cut. Such apparatus would be particularly desirably in those situations where a relatively short section of tube-wall is to be removed, such as less than about 3 feet of tube-wall.

SUMMARY OF THE INVENTION

The present invention provides a relatively portable tube cutting apparatus which is especially useful for cutting relatively short sections from a tube-wall. The apparatus includes a carriage which upon a motorized cutting means is securely attached, with the carriage being movably supported on a frame to allow movement of the carriage along a linear path relative to the frame, and articulated support means for securing the frame to a tube-wall. The articulated support means allows the apparatus to be fastened to a fixed point on the tube-wall while allowing lateral repositioning of the cutting means relative to the tube-wall. The apparatus provides means whereby a smooth even cut of up to about a 3 foot length can be made in a boiler tube-wall more quickly and easily than was previous possible using conventional track mounted boiler tube cutting apparatuses.

BRIEF DESCRIPTION OF THE DRAWINGS

Figures 1, 2:
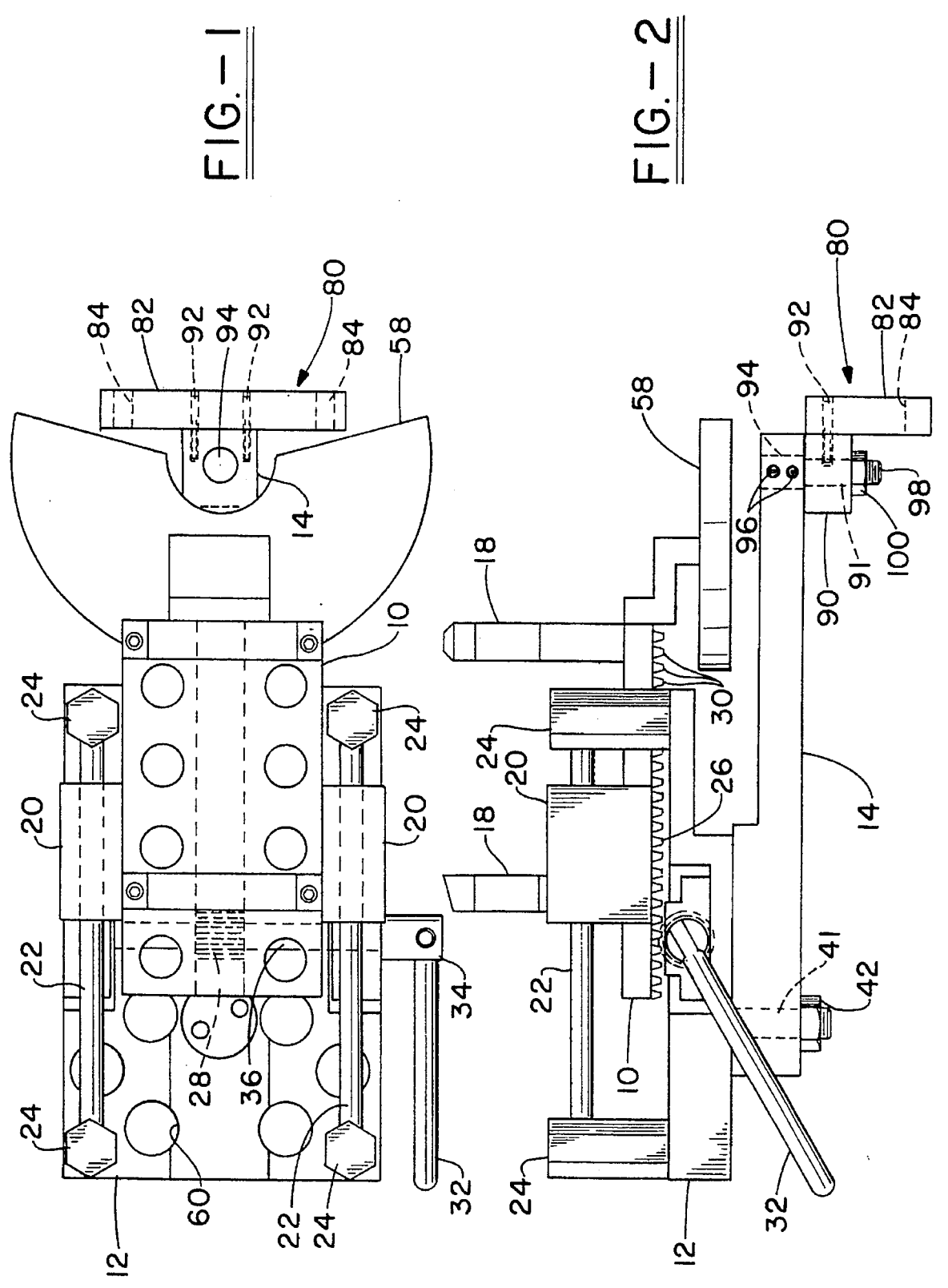

FIG. 1 is a top is view of the cutting apparatus;

FIG. 2 is a side elevational view of the cutting apparatus shown in FIG. 1;

FIG. 3 is a bottom plan view showing the frame rotated approximately 40° with respect to the articulated fastening means; and FIG. 4 is a side elevational view similar to FIG. 2 showing the apparatus secured to a boiler tube-wall with a pneumatic saw secured to the cradle of the cutting apparatus.

DESCRIPTION OF THE PREFERRED EMBODIMENT

The cutting apparatus broadly comprises a carriage 10 adapted for movement in a linear direction relative to a frame 12 which has articulated support means for securing the device to a boiler tube-wall.

Referring to the figures generally, the carriage 10 has a flat rectangular base with upwardly projecting supports 16 onto which a cutting tool 52 (shown in FIG. 4) is placed. The cutting tool 52 is securely fastened onto the carriage 10 with fasteners 18 which are connected to the supports 16 by screws or other suitable means. Various other means, such as straps, may be used for securing the cutting tool 52 to the carriage. A pair of block-shaped guides 20 project upwardly from opposite sides of the carriage 10. Each guide 20 has a bore extending therethrough in a direction parallel to the direction of the cutting tool path. A bushing is inserted into each bore to provide a smooth non-abrading interior bore surface through which one of a pair of parallel guide rods 22 pass. The parallel guide rods 22 are mounted to the frame 12 by means of posts 24 with the axes of the rods being parallel with the direction of the cutting tool path. The guides 20 and rods 22 restrict movement of the carriage 10 to a single linear path relative to the frame 12. The posts 24 also act as stops to define the extent to which the carriage is permitted to travel along the linear path. The diameter of the rods 22 are in close tolerance with the dimensions of the busing surface to eliminate movement of the carriage 10 with respect to the frame 12 except in the direction parallel to the axes of the rods 22. Various other guide means for restricting the movement of one part of an apparatus to a single direction with respect to another part, such as those used on sliding drawers, would also be suitable for use with the invention.

The device is preferably provided with a rack 26 and pinion gear 28 arrangement which is operative to advance the carriage 10 and attached cutting tool 52 along a linear cutting path parallel to the axes of the rods 22. The pinion gear 28 is centrally located on the frame 12 and engages the teeth 30 of rack 26 which is affixed longitudinally along the bottom of the carriage 10. The pinion gear 28 can be rotated by turning lever 32 operatively secured by hub 34 to a transverse rod 36 passing through a bearing opening in a side wall of frame 12 and axially secured to pinion gear 28. Rotation of pinion gear 28 causes meshing of pinion gear 28 with rack 26 to effect movement of the carriage 10 relative to the frame 12 along the linear cutting path. The pinion gear may be power operated, although hand controlled rotation is preferred. Alternative means for advancing the carriage, such as a screw drive, gears, and/or chains, are well known and are therefore considered to be within the scope of the invention. While the carriage 10 is preferably advanced by means of a rack and pinion gear mechanism, the invention is capable of functioning without any special means for advancing as by merely pushing the carriage forward by hand.

The cutting apparatus is fastened or secured to a tube-wall bank 74 by means of an articulated support means including an arm 14 which is pivotally connected at one end to frame 12 by means of a bolt or threaded rod 41 fixedly depending from a central portion of the frame and passing through a hole or bore in arm 14. A nut 42 is used to fix the frame 12 relatively to the arm 14 once a desired spacial orientation of the frame relatively to the arm has been achieved. A mounting bracket 80 is pivotally connected to the other end of arm 14. Mounting bracket 80 includes a mounting plate 82 preferably having a pair of vertically elongated slots 84, each of which is adapted to receive a heavy duty adjustment bolt 86 welded to a back plate 88. The mounting bracket 80 also includes a journal block 90 fixedly secured to the mounting plate 82 by suitable means such as threaded fasteners 92. The journal block 90 has a central vertical through bore 91 through which passes a depending rod 94 which is fixedly secured to arm 14 such as by pins 96. Depending rod 94 includes a smooth relatively larger radius portion, the outer surface of which acts as a bearing surface against the through bore 91, and a threaded reduced diameter portion 98 for fixing the relationship between the arm 14 and the mounting bracket 80 by means of nut 100 after arm 14 has been rotated to a desirable position relative to mounting bracket 80. The back plate 88 is welded or otherwise secured to the boiler tube-wall 74 as shown in FIG. 4.

Either of nuts 42 and 100 can be replaced with a nut 102 having an integrally attached handle 104 which is pivotally connected to nut 102 by means of a pin 106. The above nut-wrench combination allows for quick loosening, repositioning and refixing of the apparatus as desired without the need for separate tools.

The articulated support means of the invention allows the cutting tool to be rotated and moved laterally relative to a fixed point of securement of the apparatus to a boiler tube-wall while allowing rotation of the cutting means relative to the support means, thereby providing an apparatus which is capable of quickly and easily providing a relatively long, smooth, even cut through a boiler tube-wall.

Referring to FIG. 4, the device is preferably used in association with a cutting tool having a rotating circular blade 54 or disk operatively actuated by a power source such as a motor 56. The preferred motor 56 is a pneumatic motor typically comprising a multiple vane air driven motor and powered by compressed air ordinarily available in industrial plants. A satisfactory pneumatic motor for use in the present invention generates about 3 to about 7 and desirably from abut to about 5.5 horsepower and about 3,500 to about 6,500 and desirably from about 4,500 to about 5,500 RPM at a standard factory air pressure of about 90 psi.

For safety reasons, the device preferably has a blade guard 58 attached to the carriage 10 and covering that portion of the blade facing the operator.

The major components of the device, such as the frame 12, arm 14 and carriage 10 are preferably machined from aluminum. Aluminum is preferred because it has a good balance of desirable properties, such as light-weight, high-strength, toughness and corrosion resistance. The replaceable grip pads are preferably made from carbon steel because of its relatively low cost and toughness.

To further reduce the weight of the device without deleteriously effecting its structural strength, holes 60 are preferably provided in selected locations on the carriage 10 and frame 12.

Although the present invention has been described for use in cutting vertical tubes, it is readily apparent that horizontal tubes or other axial directional tubes can be cut in accordance with the present invention.

While in accordance with the patent statutes the best mode and preferred embodiment has been set forth, the scope of the invention is not limited thereto, but rather by the scope of the attached claims.

What is claimed is:

1. A boiler tube-wall cutting apparatus, comprising:

a frame, a movable carriage supported on said frame movable along a linear path relative to said frame, means for guiding said carriage along said linear path to substantially eliminate movement of the carriage except along said linear path, support means for supporting said frame on a boiler tube-wall, said support means including a mounting bracket and a support arm for mounting said frame to the boiler tube-wall, one end of said support arm being pivotally secured to said mounting bracket, said frame being pivotally secured to the other end of said support arm, and cutting means secured to said movable carriage.

2. A tube cutting apparatus as set forth in claim 1, further comprising a rack having a plurality of teeth, said rack affixed to said carriage, and a pinion gear centrally located on said frame, the teeth of said pinion gear engaging the teeth of said rack whereby rotation of said pinion gear causes said rack to effect movement of said carriage along said linear path.

3. A tube cutting apparatus as set forth in claim 2, wherein said guide means comprises a pair of spaced parallel rods mounted to said frame and passing through a corresponding pair of guides attached to said carriage, each said guide having a bore therein, said bores being dimensioned to allow said carriage to be moved only along said linear path parallel to said rods.

4. A tube cutting apparatus as set forth in claim 1, wherein said cutting means is a motor driven rotating abrasive wheel.

5. A tube cutting apparatus as set forth in claim 1, wherein said cutting means is a motor driven rotating carbide disk.

6. A tube cutting apparatus as set forth in claim 1, wherein said cutting means is powered by a pneumatic motor.

7. A boiler tube-wall cutting apparatus, comprising:

a frame, a movable carriage supported on said frame movable along a linear path relative to said frame, at least a guide rod for guiding said carriage along said linear path, a support for supporting said frame on a boiler tube-wall, said support including a mounting bracket and a support arm located between said frame and the boiler tube wall for mounting said frame to the boiler tube-wall, one end of said support arm being pivotally secured to said mounting bracket, said frame being pivotally secured to the other end of said support arm, and a cutting tool secured to said movable carriage.

8. A boiler tube-wall cutting apparatus according to claim 7, wherein said support arm allows rotation of said frame and said carriage relative to a fixed point of securement of said cutting apparatus to a boiler tube-wall.

9. A boiler tube-wall cutting apparatus according to claim 1, wherein said support arm allows rotation of said frame and said carriage relative to a fixed point of securement of said cutting apparatus to a boiler tube-wall.

10. A boiler tube-wall cutting apparatus according to claim 8, further comprising a rack having a plurality of teeth, said rack affixed to said carriage, and a pinion gear located on said frame, the teeth of said pinion gear engaging the teeth of said rack whereby rotation of said pinion gear causes said rack to effect movement of said carriage along said linear path.

11. A boiler tube-wall cutting apparatus according to claim 10, wherein said guide pair of spaced parallel rods mounted to said frame and passing through a corresponding pair of guides attached to said carriage, each said guide having a bore therein, said bores being dimensioned to allow said carriage to be moved only along said linear path parallel to said rods.

12. A boiler tube-wall cutting apparatus, comprising:

a frame, a movable carriage supported on said frame movable along a path relative to said frame, a support arm for supporting said frame on a boiler tube-wall, said support arm being located between said frame and the boiler tube-wall and pivotally attached to the boiler tube-wall and to said frame, and a cutting tool secured to said movable carriage.

13. A boiler tube-wall cutting apparatus according to claim 12, including a rack having a plurality of teeth, said rack affixed to said carriage, and a pinion gear located on said frame, the teeth of said pinion gear engaging the teeth of said rack so that rotation of said pinion gear causes said rack and said carriage to move along said path.

* * * * *